(12) United States Patent
Tanikawa et al.

(10) Patent No.: US 7,159,839 B2
(45) Date of Patent: Jan. 9, 2007

(54) CONTROL DEVICE

(75) Inventors: Tsuyoshi Tanikawa, Osaka (JP);
Tadayuki Yakushijin, Osaka (JP);
Tomohiro Nakata, Osaka (JP)

(73) Assignee: Fujikin Incorporated, Osaka (JP)

( * ) Notice: Subject to any disclaimer, the term of this patent is extended or adjusted under 35 U.S.C. 154(b) by 49 days.

(21) Appl. No.: 10/525,954

(22) PCT Filed: Aug. 22, 2003

(86) PCT No.: PCT/JP03/10605

§ 371 (c)(1),
(2), (4) Date: Feb. 28, 2005

(87) PCT Pub. No.: WO2004/023012

PCT Pub. Date: Mar. 18, 2004

(65) Prior Publication Data

US 2005/0269534 A1 Dec. 8, 2005

(30) Foreign Application Priority Data

Sep. 2, 2002 (JP) ............................. 2002-256621

(51) Int. Cl.
*F16K 31/126* (2006.01)
(52) U.S. Cl. ....................................................... 251/63
(58) Field of Classification Search ................... 251/63
See application file for complete search history.

(56) References Cited

FOREIGN PATENT DOCUMENTS

| JP | 03-9740 | 3/1991 |
|----|---------|--------|
| JP | 3-9740 | 3/1991 |
| JP | 05-187572 | 7/1993 |
| JP | 5-187572 | 7/1993 |
| JP | 8-303630 | 11/1996 |
| JP | 08-303630 | 11/1996 |
| JP | 9-26052 | * 1/1997 |
| JP | 2000-009254 | 1/2000 |
| JP | 2000-9254 | 1/2000 |

OTHER PUBLICATIONS

International Search Report dated Nov. 18, 2003.

* cited by examiner

*Primary Examiner*—J. Casimer Jacyna
(74) *Attorney, Agent, or Firm*—Armstrong, Kratz, Quintos, Hanson & Brooks, LLP

(57) ABSTRACT

Booster means 11 for transmitting a force acting on a piston 10 to a valve stem 9 on amplification comprises pivotal members 25 each supported by casings 7, 8 so as to hold an outer end and an inner end thereof in contact with an outer peripheral portion of the piston 10 and a flange portion 22a formed on the valve stem 9 respectively from below and to be pivotally movable about a horizontal rod 26 positioned closer to the inner end. Metal bellows 16 are provided between an outer peripheral portion of the casing top wall 8a and the outer peripheral portion of the piston 10 for sealing off a compressed air admitting space.

1 Claim, 1 Drawing Sheet

CONTROL DEVICE

TECHNICAL FIELD

The present invention relates to control devices, and more particularly to control devices which have booster means for transmitting the force acting on a piston to a valve stem on amplification and which are suitable as valves for use at high temperatures.

BACKGROUND ART

Already known are control devices which comprise a valve case having a fluid channel, a casing provided on an upper portion of the valve case, a valve stem disposed inside the casing and reciprocatingly movable upward and downward to thereby cause a valve element to open or close the fluid channel, a piston upwardly or downwardly movably provided inside the casing and defining a compressed air admitting space along with a top wall of the casing, and booster means for transmitting the force acting on the piston to the valve stem upon amplification (see, for example, the publication of JP-A No. 07-139648).

Control devices having such booster means are termed high-temperature valves and used at a temperature of at least 150° C. in some cases, but still remain to be improved in heat resistance and have problems with respect to sealability and durability especially for use at high temperatures of about 300° C.

An object of the present invention is to provide a control device having booster means and usable at high temperatures.

DISCLOSURE OF THE INVENTION

The present invention provides a control device comprising a valve case having a fluid channel, a casing provided on an upper portion of the valve case, a valve stem disposed inside the casing and reciprocatingly movable upward and downward to cause a valve element to open or close the fluid channel, a piston upwardly or downwardly movably provided inside the casing to define a compressed air admitting space along with a top wall of the casing, and booster means for transmitting a force acting on the piston to the valve stem on amplification, the control device being characterized in that the booster means comprises at least one pivotal member supported by the casing so as to hold an outer end and an inner end thereof in contact with an outer peripheral portion of the piston and a flange portion formed on the valve stem respectively from below and to be pivotally movable about a horizontal rod positioned closer to the inner end, metal bellows being provided between the outer peripheral portion of the casing top wall and an outer peripheral portion of the piston for sealing off the compressed air admitting space.

When the piston of the control device of the invention moves down, the outer end of the pivotal member of the booster means moves down, thereby moving the pivotal member about the horizontal rod and moving the inner end of the pivotal member upward to move the valve stem upward. With the horizontal rod positioned closer to the pivotal member inner end, the downward force of the piston is transmitted as amplified to the valve stem. The metal bellows used for sealing off the compressed air admitting space obviates the need to use components, such as O-rings, which are inferior in heat resistance, while the use of the booster means serves to diminish the compressed air pressure acting on the metal bellows. Thus, the control device is improved in both heat resistance and pressure resistance and made suitable as a valve for use at high temperatures.

BEST MODE OF CARRYING OUT THE INVENTION

Figure 1:
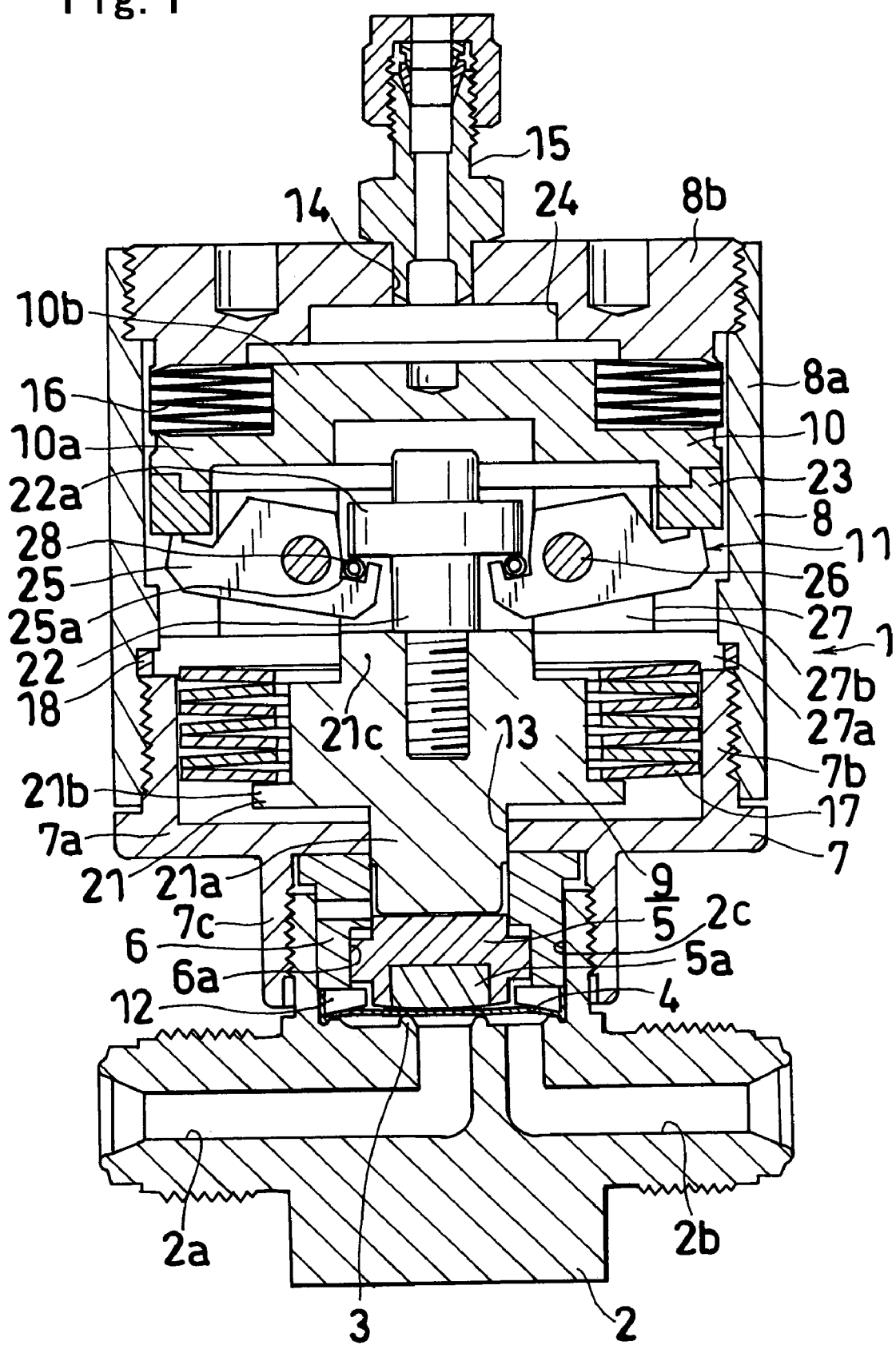
FIG. 1 is a sectional view showing an embodiment of control device according to the invention.

An embodiment of the invention will be descried below with reference to the drawing. In the following description, the terms "left" and "right" refer respectively to the left- and right-hand sides of the drawing.

FIG. 1 shows an embodiment of control device of the present invention.

The control device 1 of this embodiment comprises a valve case 2 provided with a fluid inlet channel 2a and a fluid outlet channel 2b, an annular valve seat 3 formed around a peripheral edge defining an opening of the inlet channel 2a, a diaphragm (valve element) 4 movable into or out of pressing contact with the valve seat 3 for closing or opening the fluid channel 2a, a disk (valve element holder) 5 movable upward or downward and having a diaphragm holder 5a attached to its lower end, a bonnet 6 fitted around the disk 5, a lower casing 7 provided on an upper portion of the valve case 2, an upper casing 8 joined to the lower casing 7, a valve stem 9 disposed within a space defined by the upper and lower casings 7, 8 and having a lower end in bearing contact with the valve element holder 5, a piston 10 disposed in an upper portion of the space defined by the casings 7, 8, and booster means 11 disposed in the space defined by the casings 7, 8 below the piston 10 for transmitting the force acting on the piston 10 to the valve stem 9 upon amplification.

The valve case 2 has a cavity 2c which is open upward. The inlet channel 2a has one end which is open leftward and the other end which is open at the center of bottom wall of the cavity 2c. The outlet channel 2b has one end which is open rightward and the other end which is open at a right portion of the bottom wall of the cavity 2c.

The disk 5 is in the form of a solid cylinder and has a flange at an intermediate portion thereof. The bonnet 6 is in the form of a hollow cylinder and has a lower-portion inner periphery providing a guide portion 6a of large diameter for guiding the flange of the disk 5. The disk 5 is fitted in the bonnet 6 loosely, i.e., upwardly or downwardly movably. The bonnet 6 is fitted in the cavity-2c of the valve case 2 and depressed by the lower casing 7 to thereby cause a holding adaptor 12 to secure an outer peripheral portion of the diaphragm 4 to the valve case 2.

The lower casing 7 comprises a bottom wall 7a, a peripheral wall 7b upstanding from the bottom wall 7a and having an externally threaded portion on its outer periphery, and a hollow cylindrical downward projection 7c of small diameter extending downward from the bottom side of the bottom wall 7a and having an internally threaded portion on its inner periphery. The internally threaded portion of the downward projection 7c is in screw-thread engagement with an externally threaded portion of a peripheral wall of the valve case 2 which wall defines the cavity 2c, whereby the lower casing 7 is secured to the valve case 2.

A through bore 13 is formed in the bottom wall 7a of the lower casing 7 centrally thereof for guiding the valve stem 9 upwardly or downwardly movably.

The upper casing 8 comprises a hollow cylindrical peripheral wall 8a and a top wall 8b in the form of a disk and screwed in an internally threaded upper end portion of the peripheral wall 8a. The peripheral wall 8a has an internally threaded lower portion, which is screwed on the externally threaded portion of peripheral wall 7b of the lower casing 7, whereby the upper casing 8 and the lower casing 7 are joined to define the above-mentioned space inside thereof. The top wall 8b of the upper casing 8 has in its center a through bore 14 provided with a compressed air admitting coupling 15.

The valve stem 9 comprises a large-diameter shank 21 having a downward projection 21a slidably inserted through the center through bore 13 of the lower casing 7, and a small-diameter shank 22 having an externally threaded lower-end portion and joined to the large-diameter shank 21 with the externally threaded portion screwed in an internally threaded upper portion of the shank 21. The large-diameter shank 21 further has a flange portion 21b positioned at the base end of the downward projection 21a, and an upper end portion 21c having a smaller diameter than the other portion thereof and butted against the small-diameter shank 22. The shank 22 has at an intermediate portion thereof a flange portion 22a having a slightly smaller diameter than the upper end portion 21c of the large-diameter shank 21.

The piston 10 is in the form of a disk comprising a large-diameter lower portion 10a and a small-diameter upper portion 10b. An annular piston ring 23 is joined to the outer peripheral portion of lower side of the large-diameter portion 10a. A recessed portion 24 is formed in the lower surface of top wall 8b of the upper casing 8 centrally thereof. A space provided by the recessed portion 24 between the top wall 8b of the upper casing 8 and the piston 10 serves as a compressed air admitting space.

Provided around the small-diameter portion 10b of the piston 10 are metal bellows 16 generally in the form of a hollow cylinder and having a lower end secured to the upper surface of the large-diameter portion 10a and an upper end secured to the lower surface of top wall 8b of the upper casing 8, whereby the compressed air admitting space is sealed off. The metal bellows 16 are termed welded bellows and are made by stamping out disks from a metal sheet to obtain wavy precision plates and welding the wavy plates along the inner peripheries and outer peripheries thereof The booster means 11 has a plurality of pivotal members 25 each supported by a horizontal rod 26 so as to be pivotally movable about the rod. Each pivotal member 25 has its outer end and its inner end brought into contact with the lower surface of the piston ring 23 and the lower surface of the flange portion 22a of small-diameter shank 22 of the valve stem 9, respectively, from below. The position where the outer end of the pivotal member 25 is in contact with the piston is at a higher level than the position where the inner end of the pivotal member 25 is in contact with the valve stem 9. The axis of the horizontal rod 26 is positioned closer to the inner end of the pivotal member 26 than the midpoint between the position of contact of the outer end of the member 25 with the piston and the position of contact of the inner end of the member 25 with the valve stem 9. Accordingly, when the piston 10 moves down, the outer end of each pivotal member 25 of the booster means 11 moves down, thereby moving the pivotal member 25 about the horizontal rod 26 and moving the inner end of the pivotal member 25 upward to move the valve stem 9 upward. With the horizontal rod 26 positioned closer to the pivotal member inner end, the downward force of the piston 10 is transmitted as amplified to the valve stem 9. The ratio of amplification is (the distance from the axis of the horizontal rod to the position of contact of the pivotal member outer end with the piston)/(the distance from the axis of the horizontal rod to the position of contact of the pivotal member inner end with the valve stem).

For example, three or four pivotal members 25 are arranged at an angular spacing of 120 degrees or 90 degrees about the axis of the valve stem 9. The horizontal rods 26 are supported by a hollow cylindrical retainer 27 positioned on the large-diameter shank 21. The retainer 27 comprises a bottom wall 27a in the form of a disk having a hole, and a peripheral wall 27b having cutouts formed at predetermined intervals and permitting the movement of the respective pivotal members 25. The inner end of each pivotal member 25 has an indented portion 25a facing upward. A pin 28 rollably provided in the indented portion 25a is adapted to contact the flange portion 22a of small-diameter shank 22 of the valve stem 9.

A biasing member 17 for urging the valve stem 9 downward comprises disc springs and is held by the flange portion 21b of large-diameter portion 21 of the valve stem 9 and the bottom wall 27a of the retainer 27. A metal seal 18 is provided around the outer periphery of bottom wall 27a of the retainer 27 and positioned on the upper end of the peripheral wall of the lower casing 7.

FIG. 1 shows the piston 10 in an upper position, and the valve stem 9 biased by the biasing member 17 and located in a lower position, the stem 9 pressing the diaphragm 4 against the annular valve seat 3 to close the fluid channel. When compressed air is admitted in this state through the coupling 15, the piston 10 is moved down, causing the booster means 11 to move the valve stem 9 upward to move the diaphragm 4 away from the annular valve seat 3 and open the fluid channel.

The control device 1 has metal bellows 16 for sealing off the compressed air admitting space, and no O-rings of rubber are used. The device therefore has high heat resistance and is capable of withstanding high temperatures of about 300° C. The booster means 11 incorporated provides a great diaphragm holding force even if the pressure of the compressed air admitted is small, consequently reducing the pressure to be exerted on the metal bellows 16. The control device thus provided and serviceable as a valve for use at high temperatures is therefore outstanding also in pressure resistance.

INDUSTRIAL APPLICABILITY

The control device of the invention has booster means for transmitting the force acting on a piston to a valve stem on amplification, is usable even at high temperatures and suitable as a valve for use at high temperatures.

The invention claimed is:

1. A control device comprising a valve case having a fluid channel, a casing provided on an upper portion of the valve case, a valve stem disposed inside the casing and reciprocatingly movable upward and downward to cause a valve element to open or close the fluid channel, a piston upwardly or downwardly movably provided inside the casing to define a compressed air admitting space along with a top wall of the casing, and booster means for transmitting a force acting on the piston to the valve stem on amplification, the control device being characterized in that the booster means comprises at least one pivotal member supported by the casing so as to hold an outer end and an inner end thereof in contact with an outer peripheral portion of the piston and a flange portion formed on the valve stem respectively from below and to be pivotally movable about a horizontal rod positioned closer to the inner end, metal bellows being provided between an outer peripheral portion of the casing top wall and the outer peripheral portion of the piston for sealing off the compressed air admitting space, and the inner end of each pivotal member has an indented portion facing upward, and a pin rollably provided in the indented portion is adapted to contact the flange portion of the valve stem.

* * * * *